(12) United States Patent
Barrios

(10) Patent No.: US 11,848,706 B2
(45) Date of Patent: Dec. 19, 2023

(54) MODULAR LASER COMMUNICATION SYSTEM FOR AN AIRCRAFT

(71) Applicant: Airbus (S.A.S.), Blagnac (FR)

(72) Inventor: Ricardo Barrios, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 18 days.

(21) Appl. No.: 17/850,334

(22) Filed: Jun. 27, 2022

(65) Prior Publication Data

US 2022/0416902 A1  Dec. 29, 2022

(30) Foreign Application Priority Data

Jun. 29, 2021  (EP) .................................... 21182577

(51) Int. Cl.
*H04B 10/50* (2013.01)
*B64D 47/00* (2006.01)
*H04B 10/112* (2013.01)

(52) U.S. Cl.
CPC ........... *H04B 10/503* (2013.01); *B64D 47/00* (2013.01); *H04B 10/1123* (2013.01)

(58) Field of Classification Search
CPC ... H04B 10/503; H04B 10/1123; B64D 47/00
USPC ........................................................ 398/118
See application file for complete search history.

(56) References Cited

U.S. PATENT DOCUMENTS

| | | | |
|---|---|---|---|
| 11,381,310 B2 * | 7/2022 | Schwarz | H04B 10/112 |
| 2007/0031151 A1 | 2/2007 | Cunningham et al. | |
| 2009/0202241 A1 * | 8/2009 | Yu | H04J 14/0252 398/58 |
| 2014/0016941 A1 | 1/2014 | Coleman et al. | |
| 2016/0294472 A1 * | 10/2016 | Palmer | H04B 7/0617 |

FOREIGN PATENT DOCUMENTS

WO   WO 2012/109248 A1   8/2012

OTHER PUBLICATIONS

European Search Report for Application No. 21182577 dated Dec. 7, 2021.

* cited by examiner

*Primary Examiner* — Mohammad R Sedighian
(74) *Attorney, Agent, or Firm* — KDW FIRM PLLC

(57) ABSTRACT

A laser communication system for an aircraft has optical head units, separate laser transmitting unit, laser receiving unit, optical fiber for each optical head unit, optical switching device for coupling an optical head unit and a separate laser transmitting unit, and a central control unit, the optical head units connected to the optical switching device through the optical fiber, the optical head units having an optical axis, parallel to which light is emitted or received, and an optical pointing mechanism for adjusting the respective optical axis. The separate laser transmitting unit has a laser. The control unit connects to the optical switching device, laser transmitting unit, laser receiving unit and optical head unit to control a laser based data communication through coupling an optical head unit, which is in a free line of sight to a target outside the aircraft, to the laser transmitting unit and to modulate operation of the laser transmitting unit for emitting a signal.

12 Claims, 3 Drawing Sheets

MODULAR LASER COMMUNICATION SYSTEM FOR AN AIRCRAFT

CROSS-REFERENCE TO RELATED APPLICATION

This application claims priority to EP 21182577.3 filed Jun. 29, 2021, the entire disclosure of which is incorporated by reference herein.

TECHNICAL FIELD

The disclosure herein relates to a laser communication system as well as an aircraft having such a laser communication system.

BACKGROUND

It is known to provide laser communication capabilities into vehicles, e.g. airborne platforms, such that the platforms operate as a node in a meshed network or in a point-to-point communication. The platform is then equipped with a plurality of optical heads, which comprise laser transceivers with an adjustable orientation through pan and tilt mechanisms. For providing a full coverage multiple optical heads are required, wherein the number of optical heads depends strongly on the shape of the platform. A high number of optical heads lead to an increase in weight and power demand.

SUMMARY

It is an object of the disclosure herein to provide a laser communication system for an aircraft with a reduced complexity and size, a reduced weight, and a reduced power demand, that is capable of providing substantially the same capabilities as known systems.

This object is met by the laser communication system disclosed herein. Advantageous embodiments and further improvements may be gathered from the following description.

A laser communication system for an aircraft is proposed, comprising a plurality of optical head units, at least one separate laser transmitting unit, at least one laser receiving unit, at least one optical fiber for each optical head unit, at least one optical switching device for selectively coupling at least one of the optical head units and at least one of the at least one separate laser transmitting unit, and a central control unit, wherein the optical head units are connected to the at least one optical switching device through the at least one optical fiber, wherein the optical head units each comprise an optical axis, parallel to which light is emitted or received, wherein the optical head units each comprise at least one optical pointing mechanism for adjusting the respective optical axis, wherein the at least one separate laser transmitting unit comprises a laser and a high power optical amplifier, and wherein the control unit is coupled with the at least one optical switching device, the at least one laser transmitting unit, the at least one laser receiving unit and the optical head units and is adapted to control a laser based data communication through coupling at least one of the optical head units, which is in a free line of sight to at least one target outside the aircraft, to the at least one separate laser transmitting unit and to modulate the operation of the at least one separate laser transmitting unit for emitting a signal.

Thus, the core components of the communication system are the at least one optical switching device and the control unit, which together with the optical head units and the at least one laser transmitting unit form the laser communication system, which is modular and has several advantages with regard to weight, size, and power demand.

The optical head units are placed on strategically suitable locations across the aircraft fuselage, depending on the desired coverage, the expected motion behavior of the aircraft as well as potential occlusions through structural features or exhaust gases or fumes. For example, six or more optical head units may be used, which may be placed at a front side, a rear side, on wings, a belly fairing, a tail plane, or other parts, wherein the optical head units may be arranged on top, bottom and/or lateral surfaces. The optical head units may be arranged in a distance to each other. They may be installed on several sides of the aircraft and several optical head units may be arranged on the same side, but relatively far apart from each other, which supports compensation of occlusions from other positions of the optical head units. They are used for delivering narrow light beams to a target and/or to receive narrow light beams from a target in order to communicate with the target. For this, the optical head units each comprise an adjustable optical axis, which may be defined by lenses and/or an aperture, through which the light passes, wherein the optical axis is adjustable in its orientation.

In essence, an optical head unit may comprise an aperture of a certain diameter, such as approximately 2 to 15 cm for airborne platforms. For spacecraft, the diameter may go up to 40-50 cm for large GEO satellites. In ground based applications the diameter may even be 80-100 cm. Further, some (optional) relay optics to guide the light may be provided. Still further, a telescope (may be done though lenses or mirrors) to compress the light from the aperture size down to some value may be provided. This may be 0.5" or less. As explained further below, the optical head unit comprises a steering mechanism ("optical pointing mechanism") to point to the desired direction.

Each optical head unit comprises an optical pointing mechanism. It may comprise a plurality of actuators, which are mechanically coupled to optical elements of the respective optical head unit. It may be preferred to provide a pan and tilt mechanism that adjusts the optical axis through swiveling about two transverse axes. The laser beam that is emitted from the respective optical head unit may thus be directed to the target, if it is inside the motion range of the optical head. For example, a pan and tilt mechanism may be operable to provide swiveling motion of up to +/−60 degrees about both swiveling axes. Hence, an exit hole of each optical head unit may be constrained to a (semi) conformal window, which would drastically minimize the adverse effects to drag and stealthiness compared to traditional turrets or optical domes used in traditional laser communication systems.

Each of the optical head units is connected to an optical switching device through at least one optical fiber. In a first variant the generation of a laser beam is done in a spot separate from the optical head units. The laser beam is then transferred to a selected optical head unit. Hence, none of the components required for producing a laser beam need to be placed inside the optical head units. Resultantly, the optical head units may be dimensioned smaller than common optical heads and require clearly less power.

The communication system may be used in a vehicle, such as an aircraft, a spacecraft, a vehicle operating on ground or in water. However, the system may also be used in an Optical Ground Station network, which might be applicable to scenarios like optical GEO feeder links.

In a further variant, also received laser beams are transferred from the respective optical head to a converter that is outside the optical head units. Thus, also electro-optical converters are not required in the optical head units, which leads to a further reduced space and weight.

The optical amplifier is operable to amplify the laser beam generated by the laser. For example, the optical amplifier is provided in the form of a high power optical fiber amplifier. This may be based on solid-state-pumped Ytterbium-doped or Erbium-Ytterbium co-doped optical fiber technology. It is conceivable that such an amplifier may provide power in the range of 5 to 15 W for intended use.

The optical switching device is used for routing laser light from the at least one laser transmitting unit to a respective optical head unit. As the laser transmitting unit comprises a laser and a high power optical amplifier, the optical switching needs to handle switching of optical signals with high power. It is conceivable that the optical switching device is based on micro electro-mechanical systems (MEMs) comprising mirror matrices with movable mirrors. Also, optical switching devices based on waveguides or Mach-Zehnder modulators are conceivable.

The central control unit constitutes a core component that controls the operation of the at least one optical switching device, the at least one laser transmitting unit as well as the optical head units. It is conceivable, that the central control unit is capable of receiving a data stream from another device inside the aircraft and is operable to control the components of the laser communication system to transfer the data stream through the optical head units to a respective target. In analogy to this, the central control unit may also be operable to control the components of the laser communication system for supplying a data stream to another device inside the aircraft based on laser beams received by the optical head units.

It may also be conceivable, that the central control unit is operable to at least support the optical head units in tracking the respective target. This may as an example be conducted by using data from an initial measurement unit (IMU), a flight control computer or another device suitable for this purpose. One task may include to determine, which one of the optical head units comprises a free line of sight to the respective target. The control unit may then control the at least one optical switching device to route the laser beam to the suitable optical head unit.

In an advantageous embodiment, the system comprises M optical head units and N laser transmitting units, wherein N<M. This ratio leads to clear advantages in regard to weight, size and power, as less laser transmitting units are required than usually integrated in the total number of optical heads. However, due to the use of the optical switching device, the number of optical head units installed in the respective aircraft, is not limited and does not depend on the number of laser transmitting units. The number of laser transmitting units may depend on the desired communication scenario, e.g. the number of targets, the laser communication system needs to contact simultaneously. In addition, a certain level of redundancy may be implemented. If the aircraft acts as a relay between a target on the ground and a target in the air, two laser transmitting units would be sufficient. If a single redundancy is preferred, four laser transmitting units would be sufficient.

Still further, the at least one laser receiving unit comprises an electro-optical converter electrically couplable with the control unit. The laser receiving unit receives optical signals from the laser beam directed from a counter terminal to an optical head unit. The electro-optical converter is used for conversion of the optical signals into electrical signals. These may be supplied to another device. It is conceivable that at least one laser receiving unit is arranged outside the optical head units. For example, for each laser transmitting unit, a laser receiving unit may be provided. However, the optical head units may also comprise a laser receiving unit each. These two variants are possible, since a laser receiving unit may comprise a smaller size and require less power than a laser transmitting unit, in particular if it does not require the use of an optical pre-amplified receiver chain, such as an EDFA.

The at least one laser receiving unit may comprise a plurality of laser receiving units, wherein each optical head unit comprises one of the plurality of laser receiving units, and wherein each optical head unit comprises an electrical receiver signal interface couplable with the control unit. The electrical receiver signal interface as an example comprises an ethernet interface or another network or bus interface. Here, the receiver signals are exclusively transferred in the electrical domain from the optical head units to an external device.

The system may further comprise at least one electrical switching device connected to the control unit and couplable with the electrical receiver signal interfaces of the optical head units. Thus, the receiver signals, which are converted to the electrical domain, are transferred to the control unit for further processing or handling. Interpretation or data extraction may be performed inside the optical head units and the electrical switching device may a simple ethernet switching device. However, interpretation or data extraction may also be provided inside the at least one electrical switching device or inside the control unit, such that the electrical switching device should be operable to handle digital or analog signal streams from electrooptical converters or high speed analog/digital converters connected thereto.

In an advantageous embodiment, the system comprises at least one separate laser communication transceiver, which includes one of the at least one laser transmitting unit and one of the at least one laser receiving unit. Thus, the laser emission and modulation as well as the demodulation of a received laser beam is conducted separated from the optical head units, e.g. inside the control unit. Hence, the optical head units may comprise a first optical fiber connection between a transmission path of the optical head units and the transceiver or control unit as well as between a receiving path of the optical head unit and the transceiver of control unit. At least the transmission path is coupled with the at least one optical switching device. The receiving path may also be coupled with the at least one optical switching device. Both paths may be coupled with separate optical switching devices. A laser communication transceiver may include a protocol stack with specific EC (error correction) code and interleaver and/or ARQ (Automatic Repeat Request) to mitigate correlated atmospheric fading channel effects.

Also, the at least one optical switching device may be adapted for routing optical signals from one of the optical head units to another one of the optical head units. In this case, the optical switching device may also be 2N×2M. Faster packet switching could be enabled in the control unit. Light signals coming from an optical head unit and passing through a low noise optical amplifier may potentially be inspected still in the optical domain to determine which packets whose destination address is not the aircraft in question are to be forwarded to a second optical head unit for transmission, and consequently being rerouted to the high power optical amplifier in order for optical signal to be amplified to the appropriate level for transmission to a counter terminal some distance away. For this to work, an additional all-optical switch would be provided to cover all transceivers. If the transceivers comprise the above mentioned protocol stack, the framing structure may always be realized in a way that just through a header inspection a destination address is determined. When having a data stream, e.g. at bit level in the electrical domain, packets can be rerouted to the appropriate optical head unit, so that the full packet does not need to be further processed, incurring unnecessary additional delays, i.e. latency.

In the laser communication system, N separate laser communication transceivers are provided. Thus, all laser receiving units are realized in the transceivers outside the optical head units.

The at least one optical switching device may comprise a first optical switching device for routing transmitting signals and a second optical switching device for routing receiving signals. Both optical switching devices are designed according to different power requirements. Resultantly, the first optical switching device may comprise a larger size, weight and power requirement than the second optical switching device. The total weight, size and power requirement may be smaller than if both optical switching devices would be dimensioned the same way or may be integrated into a larger optical switching device.

The optical head units each may comprise a controller couplable with the control unit, wherein the individual controllers are connected to the at least one optical pointing mechanism in the respective optical head unit and are adapted to control the at least one optical pointing mechanism. The controllers may receive instruction signals from the control unit, which may serve to coordinate the controllers.

The disclosure herein further relates to a vehicle, in particular an aircraft, comprising at least one laser communication system according to the above description.

The concept according to the disclosure herein is not limited to an installation in an aircraft or to dedicated components. While the explanations herein often relate to an aircraft, it should not be construed as a limitation of the scope of protection. The described concept may easily be realized in other entities or already existing system that use a laser, such as a Lidar for autonomous vehicles. Thus, while the ability for pointing a laser in desired directions exist, the number of actual lasers to cover all required exit points from the vehicle can be minimized. The whole description made above and below would also apply, e.g., for an unmodulated transmitting laser.

BRIEF DESCRIPTION OF THE DRAWINGS

Further features, advantages and possible applications of the disclosure herein will be apparent from the following description of the embodiments and the figures. In this context, all the features described and/or illustrated constitute the subject-matter of the disclosure herein on their own and in any combination, also irrespective of their composition in the individual claims or their references. Furthermore, in the figures the same reference numerals stand for the same or similar objects.

DETAILED DESCRIPTION

Figure 1:
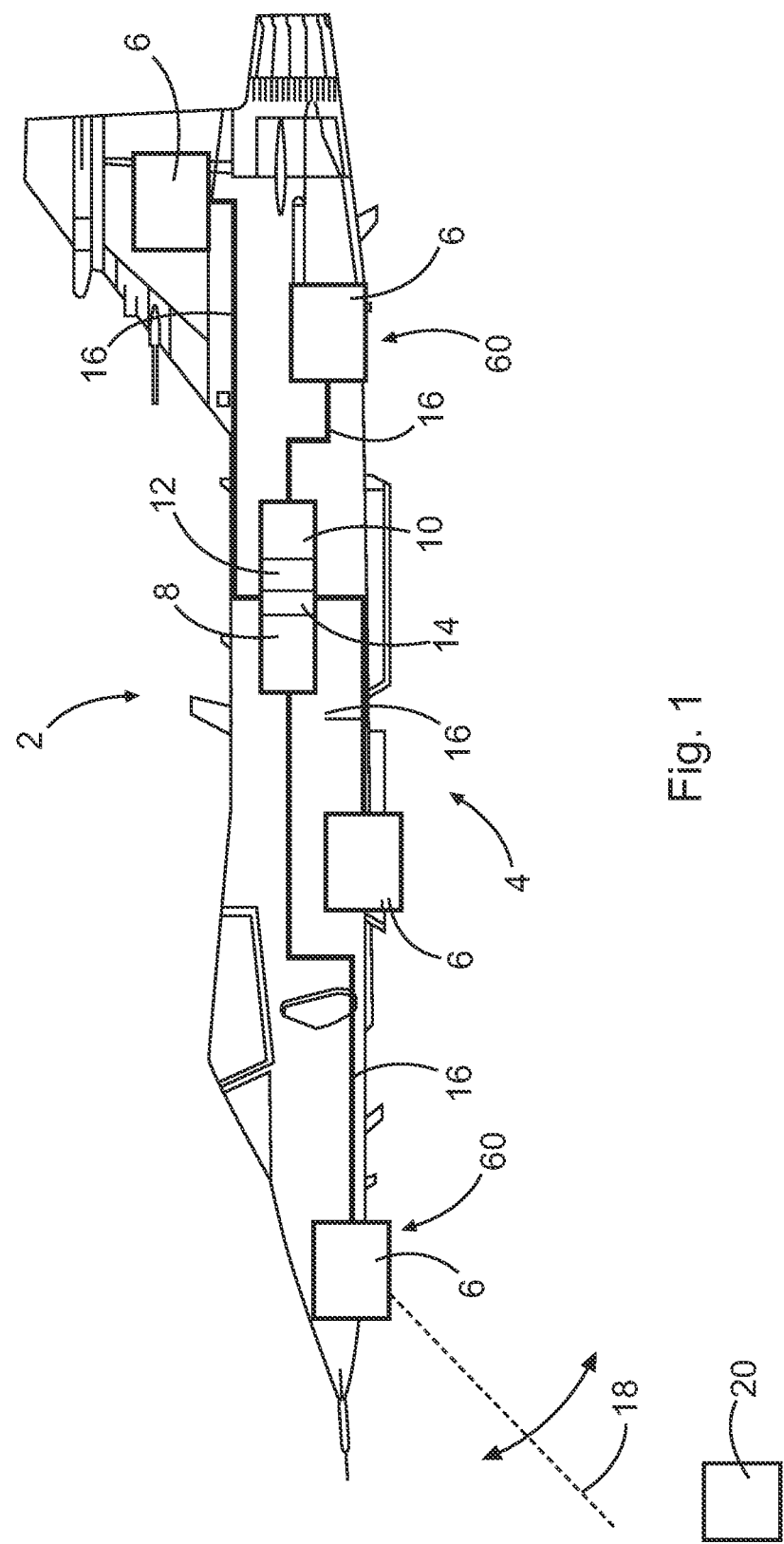
FIG. 1 shows an aircraft having a laser communication system in a schematic view.

FIG. 1 shows an aircraft 2 having a laser communication system 4 in a schematic illustration. The laser communication system 4 comprises a plurality of optical head units 6, which are distributed at the aircraft 2 to various, strategically suitable positions for laser communication. They are arranged inside the aircraft 2 behind optical windows 60 that conform to an outer surface of the aircraft 2. Accordingly, the optical head units 6 do not protrude outside the surface of the aircraft 2. The optical head units 6 are connected to a central control unit 8, which is connected to an optical switching device 10. Furthermore, the system 4 comprises a laser transmitting unit 12 as well as a laser receiving unit 14. The optical head units 6 are coupled with the optical switching device 10 through optical fibers 16. For illustration purposes, the optical head unit 6 at the front of the aircraft 2 comprises an optical axis 18, which is shown as a dashed line. The orientation of the optical axis 18 is merely as an example in nature and is adjustable.

The laser communication system 4 is capable of conducting a laser communication with a target 20 outside the aircraft 2. For this, the control unit 8 is connected to the at least one optical switching device 10, the laser transmitting unit 12, the laser receiving unit 14 and the optical head units 6. The control unit 8 is adapted to control a laser-based data communication through coupling at least one of the optical head units 6, which is in a free line of sight to the target 20 outside the aircraft 2 to the laser transmitting unit 10 and to modulate the operation of the laser transmitting unit 10 for transmitting a signal.

Figure 2:
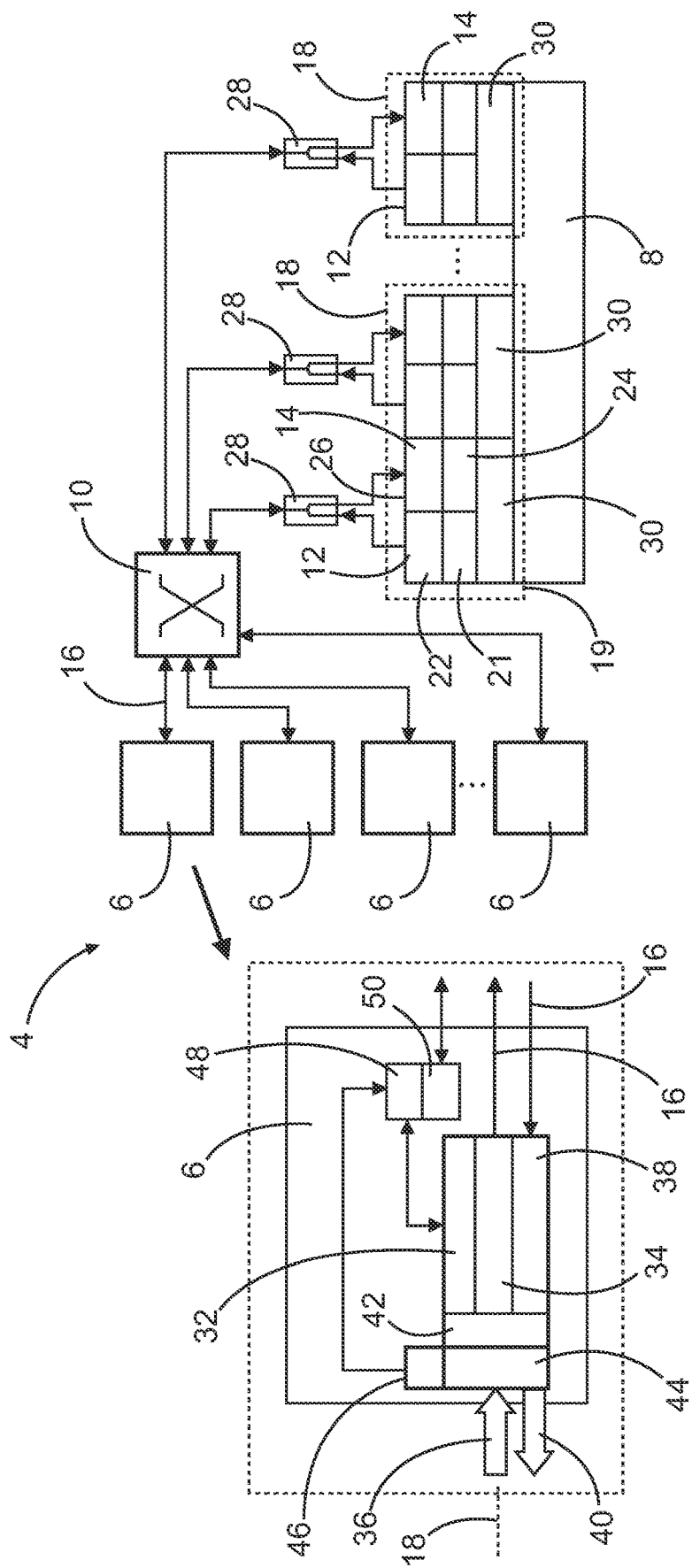
FIGS. 2 and 3 show details of the laser communication system.

In FIG. 2, further details of the system 4 are shown. Here, four optical head units 6 are connected to the optical switching device 10. In this example, the optical switching device 10 is a 4×3 switching device, which is coupled to the four optical head units 6 and three transceivers 19. The transceivers 19 each comprise a laser transmitting unit 12 and a laser receiving unit 14. The laser transmitting unit 12 comprises a laser 21 and a high power optical amplifier 22. The laser 21 is modulated in order to superimpose a data signal onto the laser beam, e.g. by selectively switching the laser 21 on and off to provide a light signal sequence, or by modulating its intensity. Coherent modulation formats are always possible as well. The high power optical amplifier 22 amplifies the laser beam to produce a transmission light beam with a high intensity.

The receiving unit 14 in turn comprises a receiver 24 as well as an optical low noise amplifier 26. The receiver 24 may be provided as an electro-optical converter. Incoming laser signals can thus be amplified to increase the intensity of optical signals impinging on the receiver 24.

The laser transmitting unit 12 and the laser receiving unit 14 are connected to an optical coupler 28, which in turn is connected with a port of the optical switching device 10. The optical coupler performs an isolation between transmitting and receiving signals for a proper operation. If transmitting and receiving signals use the same wavelength, the optical coupler 28 should be, e.g., a circulator. Alternatively, polarization may be used to achieve the required isolation level between the transmitting and receiving signals. If the transmitting and receiving signals use different wavelengths, spectral filters may be applied. If still further isolation is required after applying spectral filters, then additionally polarization based splitting-combining techniques may also be applied. In the present example, three identical transceivers 19 are provided. The control unit 8 is connected to all transceivers 19 and communication between the control unit 8 and the transceivers 19 is as an example provided through a protocol stack 30 implemented in the transceivers 19.

This protocol stack 30, which may also be referred to as FSO (free space optics) stack, may comprise a specific framing data structure that encapsulates data to be transmitted over an optical channel; a suitable Error Correction (EC) code scheme, to combat random error in bits (e.g. Redd-Solomon, LDPC, Turbo codes, polar codes, etc.); an interleaver or ARQ scheme for protection against long burst errors coming from fading events in the optical channel; and a suitable synchronization scheme that can work in orchestration with the selected data framing structure, EC code and interleaver or ARQ scheme.

The optical head units 6 are connected to the optical switching device 10 through optical fibers 16 and are capable of transferring light to and from the optical head unit 6 from and to the transceivers 19.

An optical head unit 6 is as an example shown on the left side of the drawing plane in more detail. Here, a coarse pointing assembly 44 is provided, which together with a fine pointing assembly 32 and an interface 46 for receiving instructions constitutes a pointing mechanism for adjusting the optical axis 18. A pan and tilt function is performed by the coarse pointing assembly 44, which handles a coarse pointing toward the target/counter terminal 20 with resolution of down to roughly 0.5°. The fine pointing assembly 32 performs a fine adjustment in the pointing procedure with ranges of microradians after the coarse pointing is accomplished. An optical coupling element 34 is provided for receiving incoming laser signals 36 and coupling them into the respective optical fiber 16. A collimator 38 collimates the incoming high power laser beam for sending it out as a laser transmission signal 40. A lens assembly 42 may be provided for additional processing of the light. The interface 46 is connected to a controller 48, which in turn is coupled to a network interface 50, through which a connection to the control unit 8 is accomplished.

Figure 3:
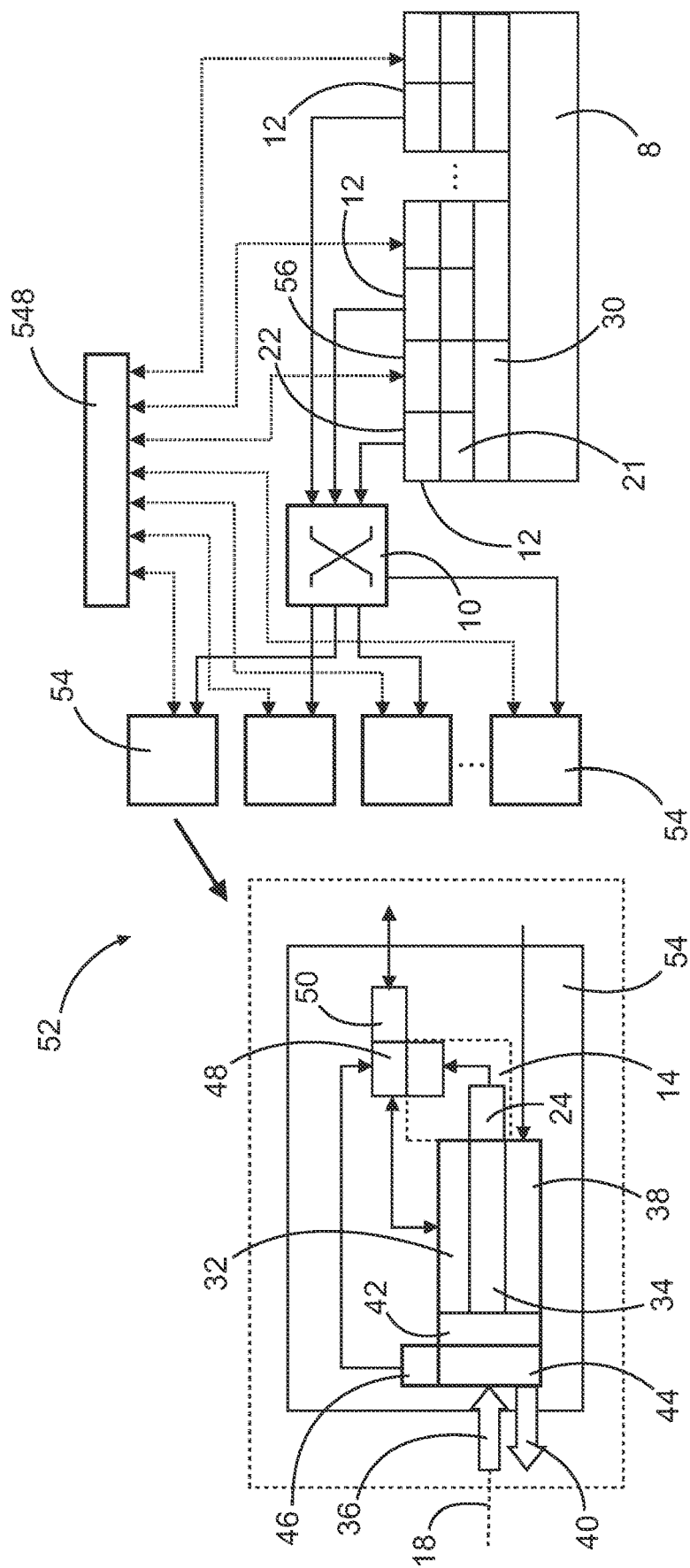

In FIG. 3, a system 52 is shown, which slightly differs from system 4 of FIG. 2. Here, also four optical head units 54 are provided, which are connected to the light switching device 10. The main difference lies in the provision of the laser receiving units 14 into the optical heads 54, such that the laser receiving signals are transferrable through the network interface 50 to the control unit 8. Here, the network interface 50 constitutes an electrical receiver signal interface. At the control unit 8, the transferred receiving signals are fed to receiving blocks 56 through an electrical switching device 58 in order to route the received data into the protocol 30. Thus, the transmit and receive signals delivered through the optical head units 54 are routed over an optical and an electrical domain to the control unit 8.

In addition, it should be noted that "comprising" does not exclude other elements or steps, and "a" or "an" does not exclude a plurality. Further, it should be noted that features that have been described with reference to any of the above embodiments may also be used in combination with other features of other embodiments described above. Reference signs in the claims are not to be regarded as a limitation.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 aircraft
4 laser communication system
6 optical head unit
8 control unit
10 optical switching device
12 laser transmitting unit
14 laser receiving unit
16 optical fiber
18 optical axis
19 transceiver
20 target
21 laser
22 optical amplifier
24 receiver/electro-optical converter
26 optical low noise amplifier
28 optical coupler
30 protocol
32 fine pointing assembly
34 optical coupling element
36 incoming laser signal
38 collimator
40 laser transmission signal
42 lens assembly
44 coarse pointing assembly
46 interface
48 controller
50 network interface/electrical receiver signal interface
52 system
54 optical head unit
56 receiving block
58 electrical switching device
60 optical window

The invention claimed is:

1. A laser communication system for an aircraft comprising:
    a plurality of optical head units;

at least one separate laser transmitting unit;
at least one laser receiving unit;
at least one optical fiber for each optical head unit;
at least one optical switching device for selectively coupling at least one of the optical head units and at least one of the at least one separate laser transmitting unit; and
a central control unit;
the optical head units being connected to the at least one optical switching device through the at least one optical fiber;
the optical head units each comprising an optical axis, parallel to which light is emitted or received;
the optical head units each comprising at least one optical pointing mechanism for adjusting a respective optical axis;
the at least one separate laser transmitting unit comprising a laser and an optical amplifier; and
the control unit being coupled with the at least one optical switching device, the at least one laser transmitting unit, the at least one laser receiving unit and the optical head units and is configured to control a laser based data communication through coupling at least one of the optical head units, which is in a free line of sight to at least one target outside the aircraft, to the at least one separate laser transmitting unit and to modulate operation of the at least one separate laser transmitting unit for emitting a signal.

2. The laser communication system according to claim 1, wherein the system comprises M optical head units and N laser transmitting units, wherein N<M.

3. The laser communication system according to claim 1, wherein the at least one laser receiving unit comprises an electro-optical converter electrically couplable with the control unit.

4. The laser communication system according to claim 3, wherein the at least one laser receiving unit comprises a plurality of laser receiving units,
wherein each optical head unit comprises one of the plurality of laser receiving units, and
wherein each optical head unit comprises an electrical receiver signal interface couplable with the control unit.

5. The laser communication system according to claim 4, further comprising at least one electrical switching device connected to the control unit and couplable with each electrical receiver signal interface of the optical head units.

6. The laser communication system according to claim 3, wherein the system comprises at least one separate laser communication transceiver, which includes one of the at least one laser transmitting unit and one of the at least one laser receiving unit.

7. The laser communication system according to claim 6, wherein the at least one optical switching device is configured for routing optical signals from one of the optical head units to another of the optical head units.

8. The laser communication system according to claim 6, wherein the system comprises M optical head units and N laser transmitting units, wherein N<M, and wherein N separate laser communication transceivers are provided.

9. The laser communication system according to claim 6, wherein the at least one optical switching device comprises a first optical switching device for routing transmitting signals and a second optical switching device for routing receiving signals.

10. The laser communication system according to claim 1,
wherein the optical head units each comprise a controller couplable with the control unit, and
wherein each controller is connected to the at least one optical pointing mechanism in the respective optical head unit and are configured to control the at least one optical pointing mechanism.

11. An aircraft comprising at least one laser communication system according to claim 1.

12. The aircraft according to claim 11, wherein the optical head units are inside the aircraft behind optical windows conforming to an outer surface of the aircraft.

* * * * *